US012472748B2

(12) United States Patent
Mizutani et al.

(10) Patent No.: US 12,472,748 B2
(45) Date of Patent: Nov. 18, 2025

(54) INK REPLENISHMENT CONTAINER AND PRINTER

(71) Applicant: SEIKO EPSON CORPORATION, Tokyo (JP)

(72) Inventors: Tadahiro Mizutani, Shiojiri (JP); Yoshihiro Koizumi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 168 days.

(21) Appl. No.: 18/224,359

(22) Filed: Jul. 20, 2023

(65) Prior Publication Data

US 2024/0025178 A1 Jan. 25, 2024

(30) Foreign Application Priority Data

Jul. 21, 2022 (JP) ................................. 2022-116301

(51) Int. Cl.
*B41J 2/175* (2006.01)

(52) U.S. Cl.
CPC ....... *B41J 2/17506* (2013.01); *B41J 2/17513* (2013.01); *B41J 2/1752* (2013.01); *B41J 2/17553* (2013.01)

(58) Field of Classification Search
CPC .... B41J 2/175; B41J 2/17506; B41J 2/17509; B41J 2/17513; B41J 2/1752; B41J 2/17523; B41J 2/1754; B41J 2/17553; B41J 2/17566; B41J 2002/17573
See application file for complete search history.

(56) References Cited

U.S. PATENT DOCUMENTS 10,350,901 B2 * 7/2019 Mizutani .............. B41J 2/17509
10,427,412 B2 10/2019 Okude et al.
2017/0326882 A1 11/2017 Okude et al.
2018/0250944 A1 * 9/2018 Ishizawa .............. B65D 1/0246
2020/0282730 A1 9/2020 Mizutani et al.

FOREIGN PATENT DOCUMENTS

JP 2017-205895 A 11/2017
JP 2020-116962 A 8/2020

* cited by examiner

*Primary Examiner* — Anh T Vo
(74) *Attorney, Agent, or Firm* — Oliff PLC

(57) ABSTRACT

There is provided an ink replenishment container for replenishing an ink by engaging with an engaging portion included in a printer. The ink replenishment container includes a cylindrical ink outlet, a wall disposed around the ink outlet outside the ink outlet in a radial direction around a central axis of the ink outlet and extending in an axial direction along the central axis, and a recess-and-projection portion disposed in at least one location of an outer peripheral surface of the ink outlet, an inner peripheral surface of the wall, and a space between the outer peripheral surface of the ink outlet and the inner peripheral surface of the wall, the recess-and-projection portion engaging with the engaging portion of the printer, in a state where the printer is replenished with the ink.

7 Claims, 16 Drawing Sheets

INK REPLENISHMENT CONTAINER AND PRINTER

The present application is based on, and claims priority from JP Application Serial Number 2022-116301, filed Jul. 21, 2022, the disclosure of which is hereby incorporated by reference herein in its entirety.

BACKGROUND

1. Technical Field

The present disclosure relates to an ink replenishment container and a printer.

2. Related Art

In the related art, an ink jet printer is known as a recording apparatus for performing recording by ejecting an ink onto a print medium. A certain type of the ink jet printer including an ink tank for storing the ink exists, and when a remaining amount of the ink is small, the ink is replenished by using an ink replenishment container accommodating the ink. For example, as the ink replenishment container, JP-A-2017-205895 discloses as follows. In the ink replenishment container, in order to prevent an erroneous type of the ink from being replenished in a printer having a configuration capable of printing by using a plurality of types of the ink, a projection portion for identifying a type of the ink is provided around an ink outlet. A recess portion corresponding to the projection portion is provided around an ink filling port of the ink tank. Therefore, it is possible to identify that the ink tank is filled with a correct type of the ink, depending on whether or not the projection portion and the recess portion are fitted to each other.

However, in the ink replenishment container disclosed in JP-A-2017-205895, the projection portion is exposed to an outside. Consequently, there is a possibility that the projection portion may be deformed or damaged due to an impact from the outside. When the projection portion is deformed or damaged, a problem arises in that an identification function of using the projection portion and the recess portion may be degraded.

SUMMARY

According to a first aspect of the present disclosure, there is provided an ink replenishment container for replenishing an ink by engaging with an engaging portion included in a printer. The ink replenishment container includes a cylindrical ink outlet, a wall disposed around the ink outlet outside the ink outlet in a radial direction around a central axis of the ink outlet and extending in an axial direction along the central axis, and a recess-and-projection portion disposed in at least one location of an outer peripheral surface of the ink outlet, an inner peripheral surface of the wall, and a space between the outer peripheral surface of the ink outlet and the inner peripheral surface of the wall, the recess-and-projection portion engaging with the engaging portion of the printer, in a state where the printer is replenished with the ink.

According to a second aspect of the present disclosure, there is provided an ink replenishment container for replenishing an ink by engaging with an engaging portion included in a printer. The ink replenishment container includes a cylindrical ink outlet, a wall disposed in a portion around the ink outlet and extending in an axial direction along a central axis of the ink outlet, outside the ink outlet in a radial direction around the central axis, and a recess-and-projection portion disposed in at least one location of an outer peripheral surface of the ink outlet, an inner peripheral surface of the wall, and a space between the outer peripheral surface of the ink outlet and the inner peripheral surface of the wall, the recess-and-projection portion engaging with the engaging portion of the printer, in a state where the printer is replenished with the ink. The wall is disposed to surround at least a portion of the recess-and-projection portion excluding a portion facing the ink outlet.

DESCRIPTION OF EMBODIMENTS

A. First Embodiment

Figure 1:
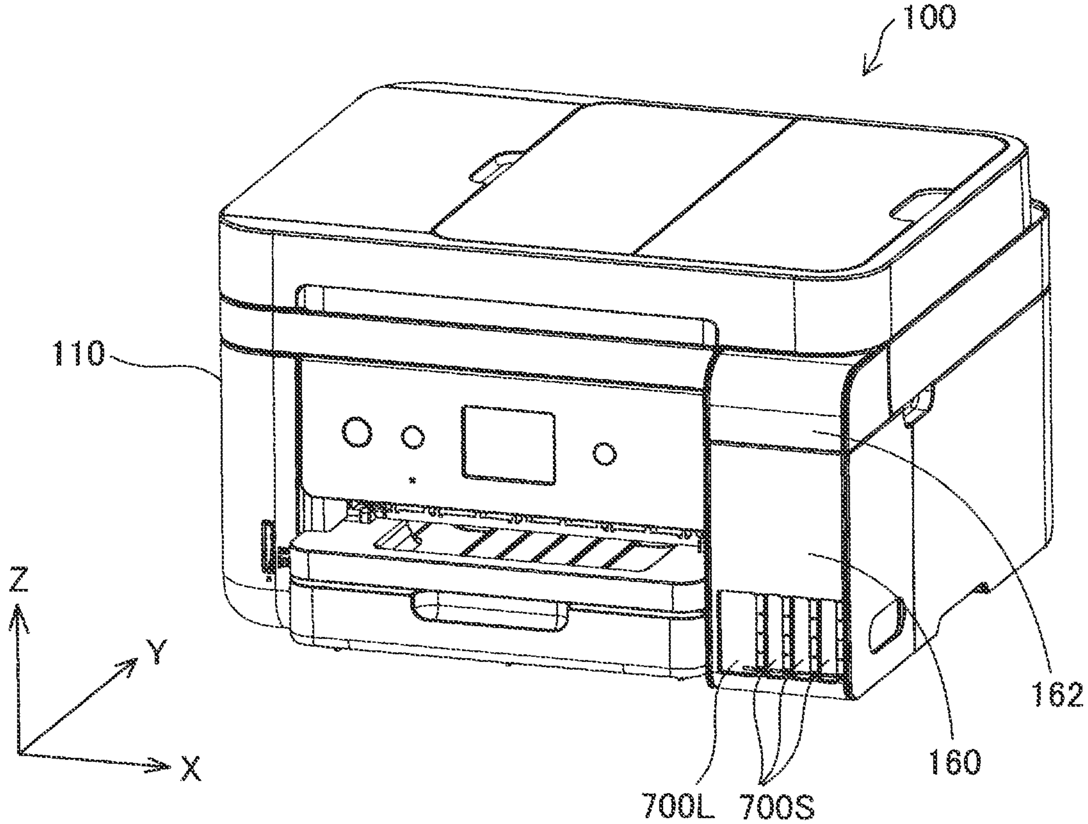
FIG. 1 is a perspective view of a printer according to a first embodiment.

FIG. 1 is a perspective view of a printer 100 according to a first embodiment. The printer 100 is an ink jet printer that performs printing by ejecting an ink onto a print medium. FIG. 1 illustrates an X-axis, a Y-axis, and a Z-axis which are orthogonal to each other. The X-axis corresponds to a width direction of the printer 100, the Y-axis corresponds to a depth direction of the printer 100, and the Z-axis corresponds to a height direction of the printer 100. The printer 100 is installed on a horizontal installation surface defined by an X-axis direction and a Y-axis direction. The "X-axis direction" means a concept including a +X-direction and a −X-direction. Similarly, the "Y-axis direction" means a concept including a +Y-direction and a −Y-direction, and the "Z-axis direction" means a concept including a +Z-direction and a −Z-direction. In addition, in the present disclosure, the +X-direction may be referred to as left, the −X-direction may be referred to as right, the +Y-direction may be referred to as rear, the −Y-direction may be referred to as front, the +Z-direction may be referred to as up, and the −Z-direction may be referred to as down.

The printer 100 includes a housing 110 having a substantially rectangular parallelepiped shape having the X-axis direction as a longitudinal direction. A carriage (not illustrated) which is movable in the X-axis direction is provided inside the housing 110. A print head which ejects the ink onto the print medium is installed in the carriage. An ink tank accommodation unit 160 accommodating a plurality of ink tanks 700 is provided on a front surface (that is, in the −Y-direction) of the housing 110. A lid 162 which can be opened and closed is attached to an upper portion (that is, in the +Z-direction) of the ink tank accommodation unit 160. The ink tank 700 includes an ink tank 700S having a small capacity of the ink which can be accommodated and an ink tank 700L having a large capacity of the ink. In the present disclosure, the ink tank 700S and the ink tank 700L will be referred to as an ink tank 700 without being distinguished from each other. Each ink tank 700 is coupled to a print head of the carriage via a tube (not illustrated) provided on a rear surface. Therefore, the ink is supplied from each ink tank 700 to the print head via the tube. In the present disclosure, each ink tank 700 is configured to be replenished with the ink from an ink replenishment container when a remaining amount of the ink is reduced. In the present disclosure, a stationary ink tank provided on a front surface of the printer 100 will be described as an example. However, the present disclosure is not limited thereto, and an ink tank mounted on a carriage may be adopted.

In addition, in the present embodiment, each of the plurality of ink tanks 700 may be configured to accommodate mutually different types of the ink, or may be configured to accommodate mutually the same type of the ink. For example, the type of the ink includes a color of the ink. Therefore, in the present disclosure, it is possible to adopt both a configuration in which the inks having mutually different colors are accommodated in each of the plurality of ink tanks 700 and a configuration in which the inks having mutually the same color are accommodated in each of the plurality of ink tanks 700. For example, the color of the ink includes black, yellow, magenta, and cyan.

Figure 2:
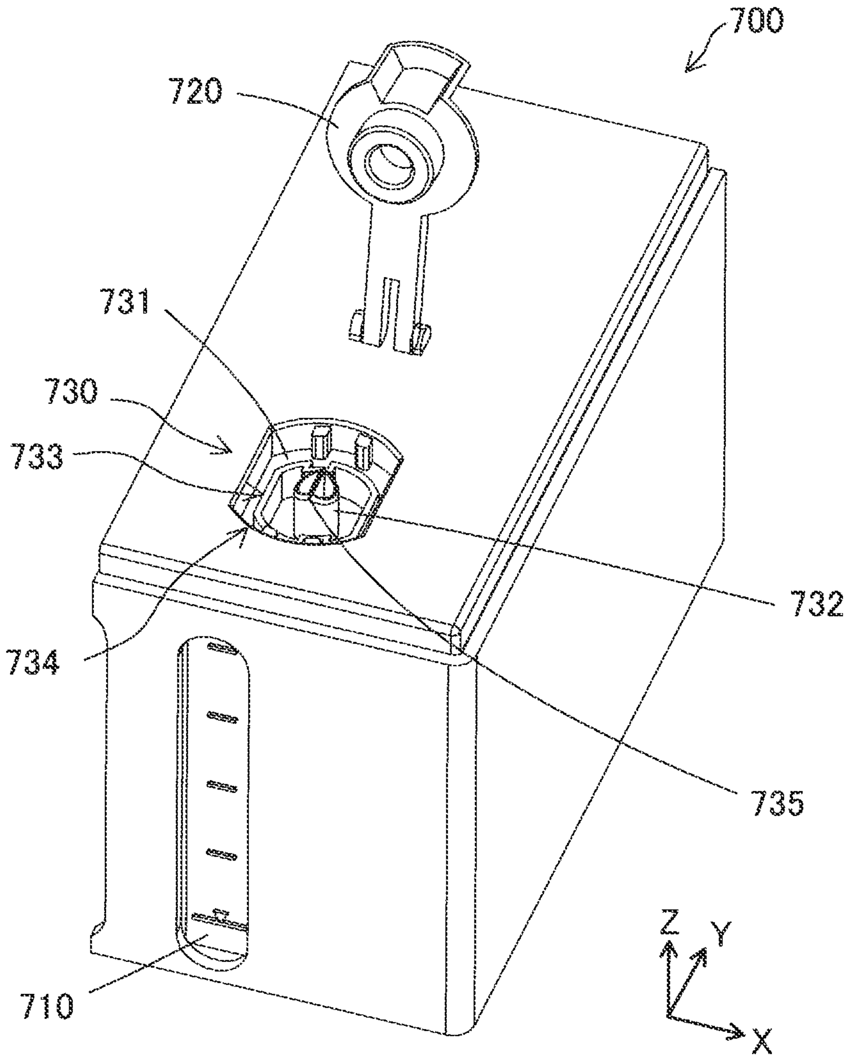
FIG. 2 is a perspective view of an ink tank according to the first embodiment.
Figure 3:
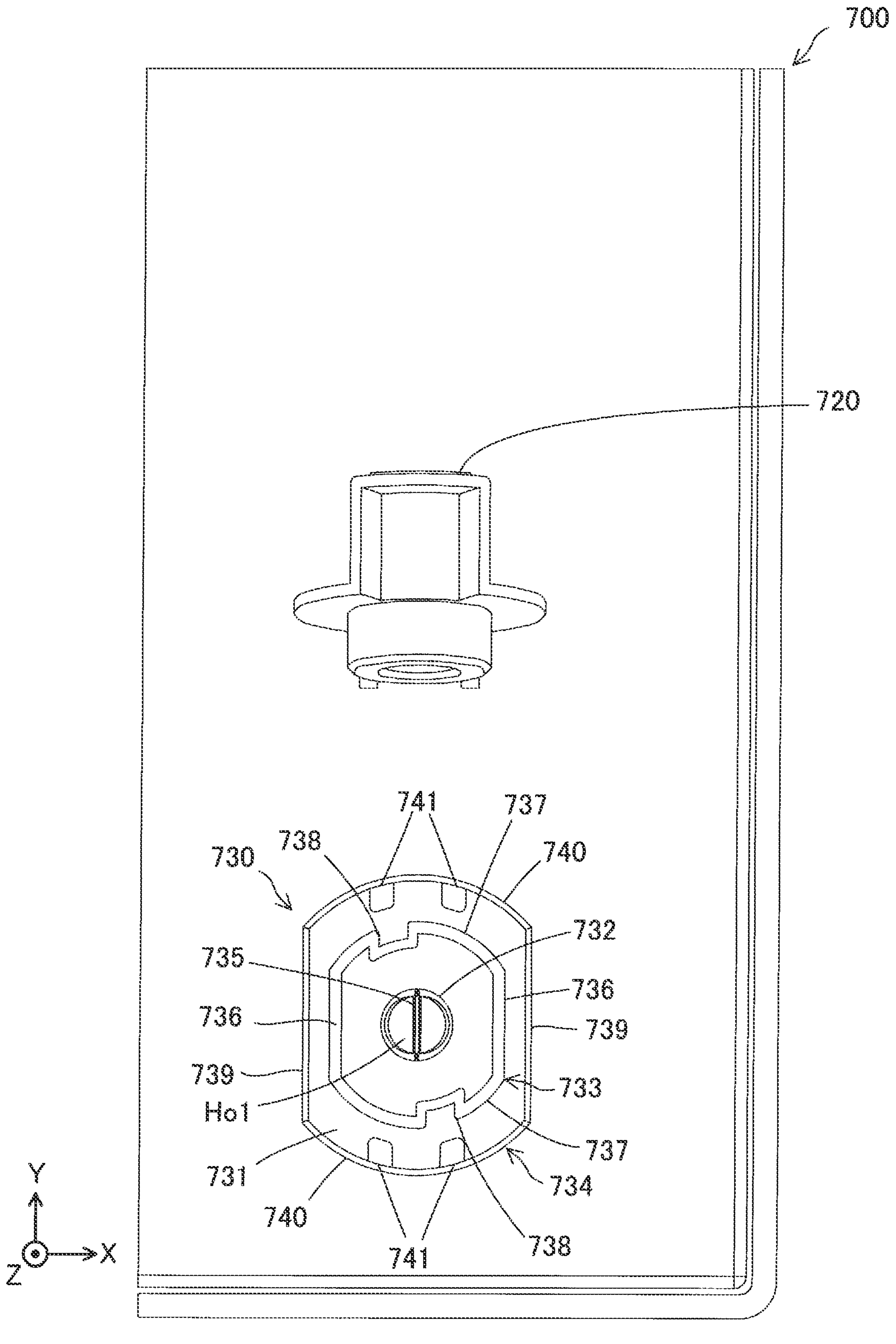
FIG. 3 is a plan view of the ink tank according to the first embodiment.

FIG. 2 is a perspective view of the ink tank 700 according to the first embodiment. FIG. 3 is a plan view of the ink tank 700 according to the first embodiment. The ink tank 700 has a substantially rectangular parallelepiped shape, and is configured to be capable of storing the ink inside the ink tank 700. A visual recognition portion 710 extending in the Z-axis direction is provided on the front surface of the ink tank 700. The visual recognition portion 710 is formed of a transparent member. Therefore, a user can visually recognize a liquid level of the ink inside the ink tank 700 through the visual recognition portion 710. A plurality of scales are marked on the visual recognition portion 710. The user can confirm the amount of the ink inside the ink tank 700 with reference to the scales. As illustrated in FIG. 1, an opening is formed on the front surface of the ink tank accommodation unit 160, and the visual recognition portion 710 of each ink tank 700 is configured to be visually recognizable from the outside.

As illustrated in FIG. 2, a tank cap 720 and an ink inlet forming portion 730 are provided on an upper surface of the ink tank 700. The tank cap 720 is formed to be fittable to the ink inlet forming portion 730. As illustrated in FIGS. 2 and 3, the user can replenish the ink tank 700 with the ink by detaching the tank cap 720 upward to expose the ink inlet forming portion 730 when the ink tank 700 is replenished with the ink.

As illustrated in FIG. 3, the ink inlet forming portion 730 has a substantially recess shape, and is formed at a center on a front side of the upper surface of the ink tank 700. The ink inlet forming portion 730 is a portion coupled to the ink replenishment container during replenishment of the ink. The ink inlet forming portion 730 includes a bottom surface 731, an ink inlet 732, an engaging portion 733, and an ink inlet surrounding portion 734. The bottom surface 731 is a horizontal surface along an XY-axis, and a first through-hole Ho1 is formed at a center position of the bottom surface 731 in the Z-axis direction.

The ink inlet 732 is disposed at a position overlapping the first through-hole Ho1. The ink inlet 732 has a substantially cylindrical shape having both ends open in the Z-axis direction. Therefore, the ink inlet 732 and the first through-hole Ho1 communicate the inside and the outside of the ink tank 700, and function as a flow path of the ink when the ink tank 700 is replenished with the ink from the ink replenishment container. The ink inlet 732 is provided with a partition wall 735 extending in the Y-axis direction and the Z-axis direction through a central axis of the opening. That is, the ink inlet 732 is substantially divided into two in the X-axis direction by the partition wall 735. In addition, as illustrated in FIG. 2, the partition wall 735 slightly protrudes upward in the opening of the ink inlet 732 in the +Z-axis direction. The projection is used for pushing an outlet valve unit of the ink replenishment container when the ink tank 700 is replenished with ink (to be described later).

As illustrated in FIGS. 2 and 3, the engaging portion 733 is provided to surround the ink inlet 732, apart from the ink inlet 732 in an XY-plane. The engaging portion 733 is a member that engages with the ink replenishment container (to be described later). The engaging portion 733 extends in the Z-axis direction, and the height in the Z-axis direction is substantially equal to the height of the ink inlet 732 in the Z-axis direction. As illustrated in FIG. 3, the engaging portion 733 has a pair of first straight line portions 736, a pair of first arch portions 737, and a printer-side recess-and-projection portion 738. Each of the first straight line portions

736 is parallel to the Y-axis direction, and is located apart from each other in a right-left direction, that is, in the X-axis direction. Each of the first straight line portions 736 is coupled to each of the first arch portions 737 in both ends in the Y-axis direction. The first arch portions 737 each are located apart from each other in a front-rear direction, that is, in the Y-axis direction. The first arch portions 737 each have a curved shape projecting in the +Y-direction or the −Y-direction in the XY-plane. Each of the first arch portions 737 is provided with the printer-side recess-and-projection portion 738. The printer-side recess-and-projection portion 738 has a recess-and-projection shape provided in the first arch portion 737, and is formed to be engageable with an recess-and-projection portion provided in the ink replenishment container (to be described later). A pair of the printer-side recess-and-projection portions 738 is formed while the ink inlet 732 is interposed therebetween. The printer-side recess-and-projection portions 738 each can be located at point-symmetrical positions around the ink inlet 732.

The printer-side recess-and-projection portions 738 are provided at different positions for each of the plurality of ink tanks 700. That is, the ink inlet forming portions 730 of the respective ink tanks 700 have mutually different shapes. Therefore, the ink tank 700 can be replenished with the ink from only the ink replenishment container 200 having a shape corresponding to the printer-side recess-and-projection portion 738 of the ink tank 700. That is, the printer-side recess-and-projection portion 738 functions as an identifier that can identify the ink replenishment container 200.

The ink inlet surrounding portion 734 is provided to surround the engaging portion 733, apart from the engaging portion 733 in the XY-plane. The ink inlet surrounding portion 734 extends in the Z-axis direction. The ink inlet surrounding portion 734 has such a shape that the engaging portion 733 is enlarged outward in the XY-plane. Specifically, the ink inlet surrounding portion 734 has a pair of second straight line portions 739 and a pair of second arch portions 740. Each of the second straight line portions 739 is located in the right-left direction, that is, in the +X-direction and the −X-direction. Each of the second straight line portions 739 extends in the Y-direction in the XY-plane, and is coupled to each of the second arch portions 740 in both ends. Each of the second arch portions 740 is located in the front-rear direction, that is, in the +Y-direction and the −Y-direction. Each of the second arch portions 740 has a curved shape projecting in the +Y-direction or in the −Y-direction in the XY-plane. The printer-side recess-and-projection portion 738 is formed in each of the first arch portions 737 of the engaging portion 733. A plurality of projections 741 are provided in the second arch portion 740 of the ink inlet surrounding portion 734. The projection 741 has a projection shape provided on an inner peripheral surface of the second arch portion 740, and is formed to be engageable with a recessed portion of a wall provided in an ink replenishment container (to be described later). A pair of the projections 741 are formed while the ink inlet 732 is interposed therebetween. The projection 741 can be present at a line-symmetrical position around the ink inlet 732.

Figure 4:
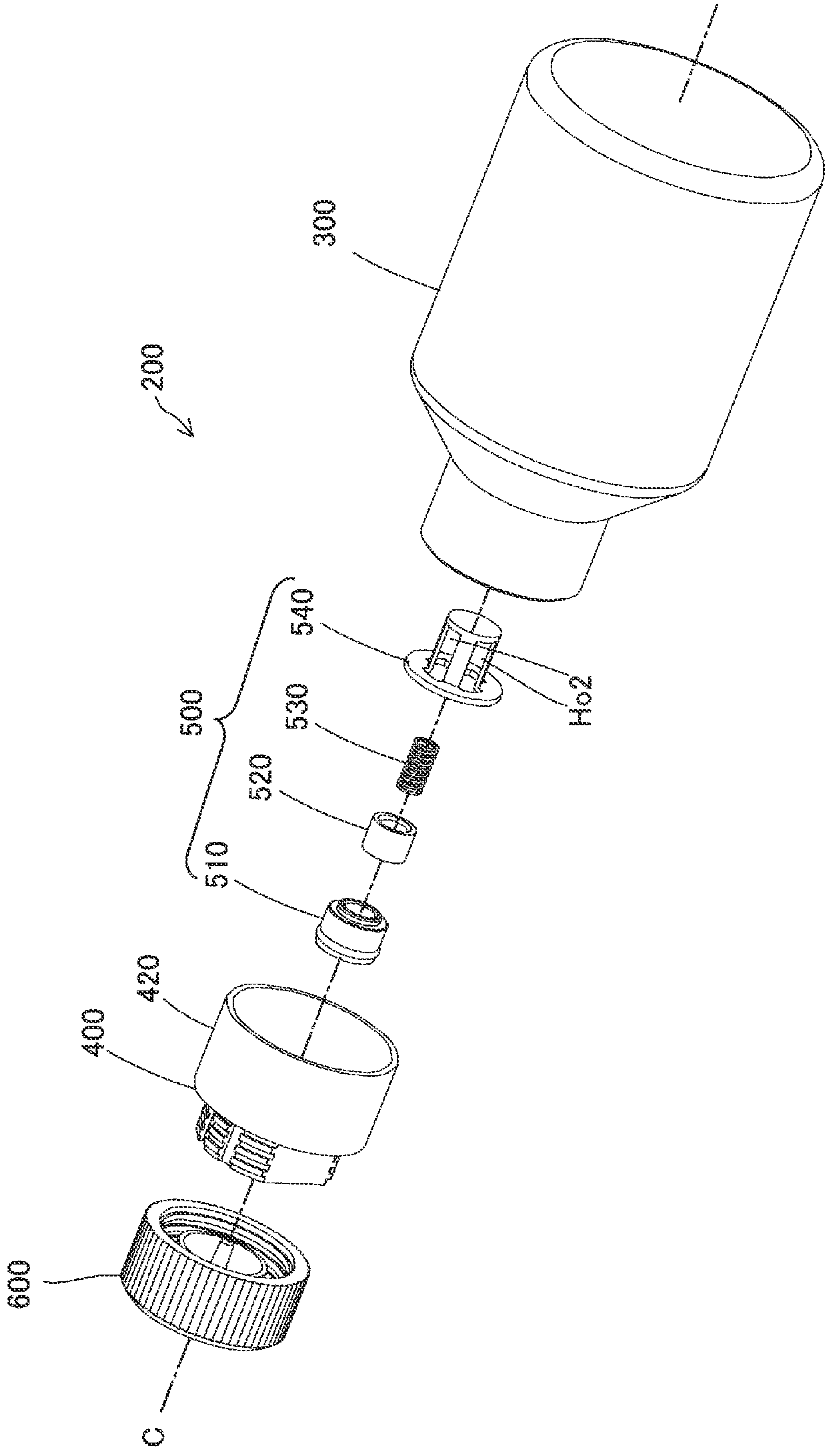
FIG. 4 is an exploded perspective view of an ink replenishment container according to the first embodiment.

FIG. 4 is an exploded perspective view of the ink replenishment container 200 according to the first embodiment. The ink replenishment container 200 is a container in which the ink for replenishing the ink tank 700 is accommodated. The ink replenishment container 200 has a container main body portion 300 capable of accommodating the ink, an ink outlet forming portion 400 forming an ink outlet, an outlet valve unit 500, and a cap 600 mounted on the ink outlet forming portion 400 and capable of covering an ink outlet 432. In the present disclosure, an upper end side on the cap 600 side of the ink replenishment container 200, will be referred to as a "tip side", and a lower end side on the container main body portion 300 side will be referred to as a "rear end side". The container main body portion 300 is a bottomed cylindrical container having an opening on the tip side. In the present disclosure, a direction parallel to a central axis C of the ink replenishment container 200 will be referred to as an "axial direction", and a direction facing outward from the central axis C will be referred to as a "radial direction".

The ink outlet forming portion 400 includes a coupling portion 420 coupled to the container main body portion 300. The outlet valve unit 500 is mounted inside the coupling portion 420. Therefore, the outlet valve unit 500 can be regarded as a member forming a portion of the ink outlet forming portion 400. When the ink tank 700 is not replenished with the ink, the outlet valve unit 500 is brought into a "valve closed state", and is configured to seal the ink outlet so that the ink does not leak to the outside. On the other hand, when the ink tank 700 is replenished with the ink, the outlet valve unit 500 is brought into a "valve opened state", and is configured to release sealing of the ink outlet so that the ink flows into the ink inlet 732 of the ink tank 700. The "valve closed state" and the "valve opened state" will be described later.

As illustrated in FIG. 4, the outlet valve unit 500 has a seal member 510, a valve body 520, a spring member 530, and a valve housing 540. The valve housing 540 internally accommodates the valve body 520 and the spring member 530. The valve housing 540 has a substantially cylindrical shape in which a tip side in a direction of the central axis C is open and the other end side is closed. In the valve housing 540, the ink inlet 732 of the ink tank 700 can be freely inserted into and removed from an opening on the tip side. The valve housing 540 has a plurality of second through-holes Ho2 penetrating in a direction intersecting with the axial direction. The second through-hole Ho2 is a hole penetrating a side wall of the valve housing 540 in the radial direction around the central axis C, and is formed to extend in the direction of the central axis C. In addition, the second through-hole Ho2 communicates with a gap in the radial direction between the valve housing 540 and the coupling portion 420.

The spring member 530 is housed inside the valve housing 540. The spring member 530 is housed on a rear end side inside the valve housing 540, and is supported by the valve housing 540. The spring member 530 biases the valve body 520 toward the tip side. In the present disclosure, the spring member 530 is a coil spring.

The seal member 510 is mounted inside the valve housing 540. The seal member 510 is located on the tip side inside the valve housing 540. The seal member 510 has a substantially cylindrical shape in which both ends are open. The seal member 510 can be formed of an elastic rubber member. The seal member 510 has an opening into and from which the ink inlet 732 is inserted and removed.

The valve body 520 is accommodated in the valve housing 540 to be movable in the axial direction. The valve body 520 is a member having a substantially columnar shape. The valve body 520 is in contact with the spring member 530 on the rear end side, and is in contact with the seal member 510 on the tip side. A side surface of the valve body 520 faces an inner surface of the valve housing 540. The valve body 520 can be guided by the valve housing 540, and can slide in the axial direction. Therefore, it is possible to smoothly switch between the "valve closed state" and the "valve opened state" (to be described later). For example, the valve body 520 can be formed of a thermoplastic resin such as polyethylene and polypropylene.

The outlet valve unit 500 may be in the "valve closed state" and the "valve opened state". Specifically, the valve body 520 is biased toward the seal member 510 by the spring member 530. When the tip side of the valve body 520 closes an opening of the seal member 510 due to the biasing, the outlet valve unit 500 is brought into the "valve closed state". Therefore, the ink cannot move to the outside from the container main body portion 300. On the other hand, the valve body 520 is pressed in a direction opposite to a biasing direction of the spring member 530 by an upper end of the partition wall 735 of the ink tank 700 during replenishment of the ink (to be described later). When the valve body 520 is separated from the seal member 510 due to the pressing, and the closed opening is opened, the outlet valve unit 500 is brought into the "valve opened state". Therefore, during replenishment of the ink, the ink accommodated in the container main body portion 300 can move to the outside of the ink replenishment container 200 through the opening of the seal member 510.

Figure 5:
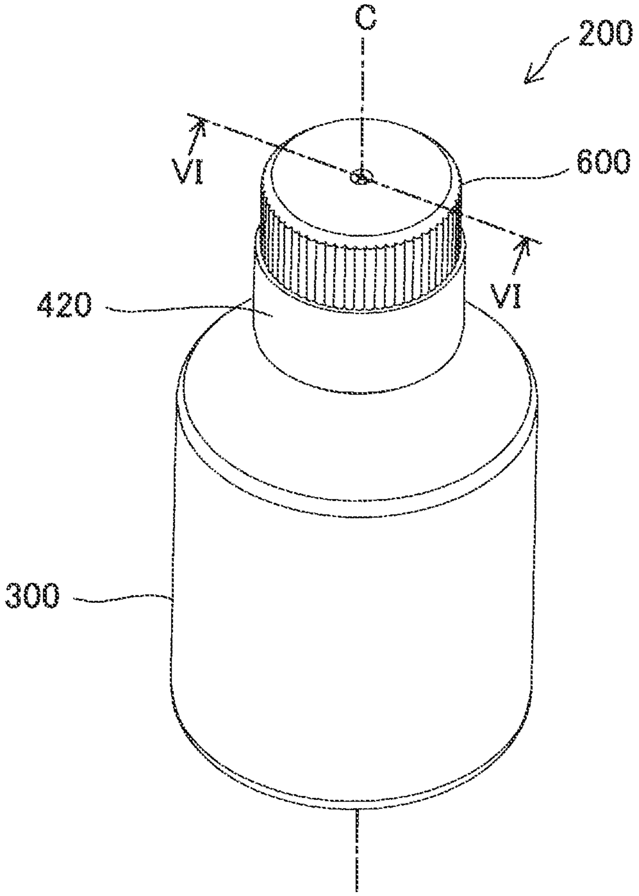
FIG. 5 is a perspective view in an upright state of the ink replenishment container according to the first embodiment.
Figure 6:
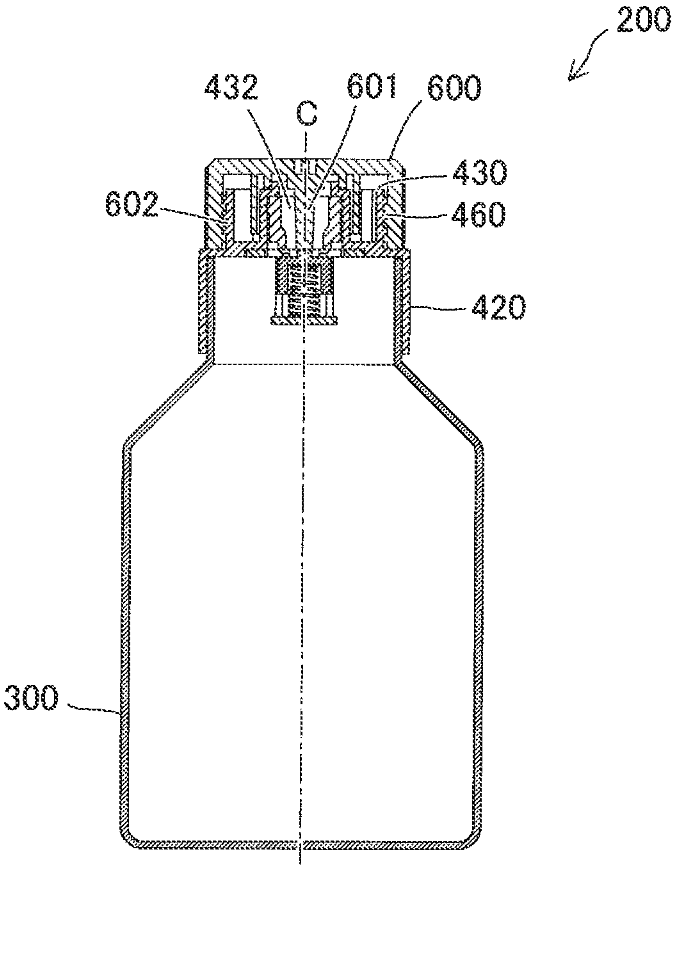
FIG. 6 is a sectional view taken along line VI-VI in FIG. 5.

FIG. 5 is a perspective view of the ink replenishment container 200 in an upright state according to the first embodiment. FIG. 6 is a sectional view taken along line VI-VI in FIG. 5. The "upright state of the ink replenishment container 200" means a state where the ink replenishment container 200 is placed on a horizontal surface such as a desk while the tip side of the ink replenishment container 200 faces upward. In the upright state, the central axis C of the ink replenishment container 200 is parallel to the Z-axis. As illustrated in FIGS. 5 and 6, when not replenished with the ink, the cap 600 is attached to the ink replenishment container 200. As illustrated in FIG. 6, a plug portion 601 is provided inside the cap 600. The plug portion 601 is a projection projecting to the rear end side along the central axis C, and is inserted into the ink outlet 432. In addition, a female screw 602 is formed on an inner peripheral surface of the cap 600. The female screw 602 is screwed to a male screw 460 formed on an outer periphery of a tip portion 430 of the ink outlet forming portion 400. In this manner, the cap 600 is attached to cover the ink outlet 432.

Next, the ink outlet forming portion 400 of the ink replenishment container 200 will be described. The ink outlet forming portion 400 in the present disclosure has a structure corresponding to the ink inlet forming portion 730 of the above-described ink tank 700. That is, during replenishment of the ink, the ink outlet forming portion 400 is configured to engage with the ink inlet forming portion 730. Specifically, a recess-and-projection portion 437 (to be described later) is configured to engage with the printer-side recess-and-projection portion 738 included in the above-described engaging portion 733.

Figure 7:
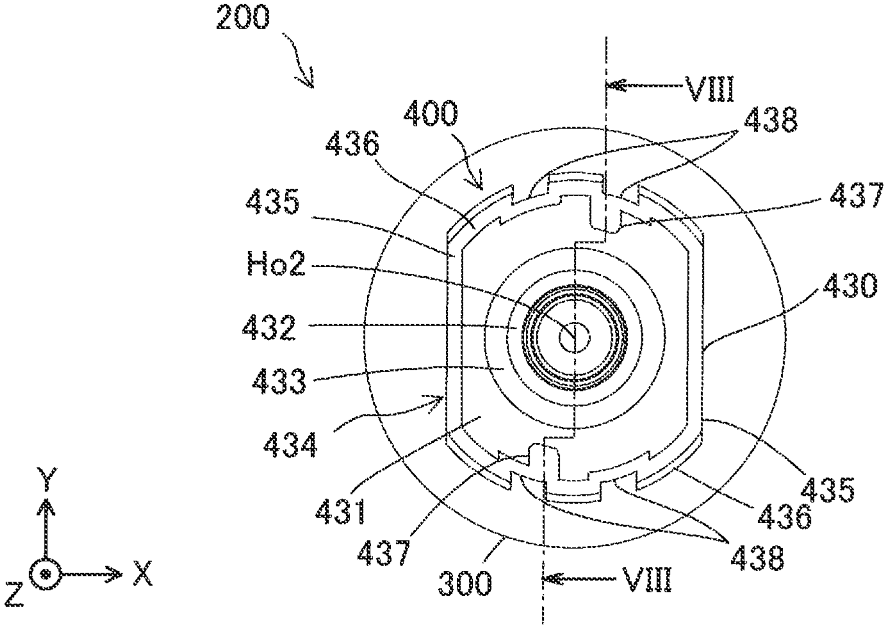
FIG. 7 is a plan view in an upright state of the ink replenishment container according to the first embodiment.
Figure 8:
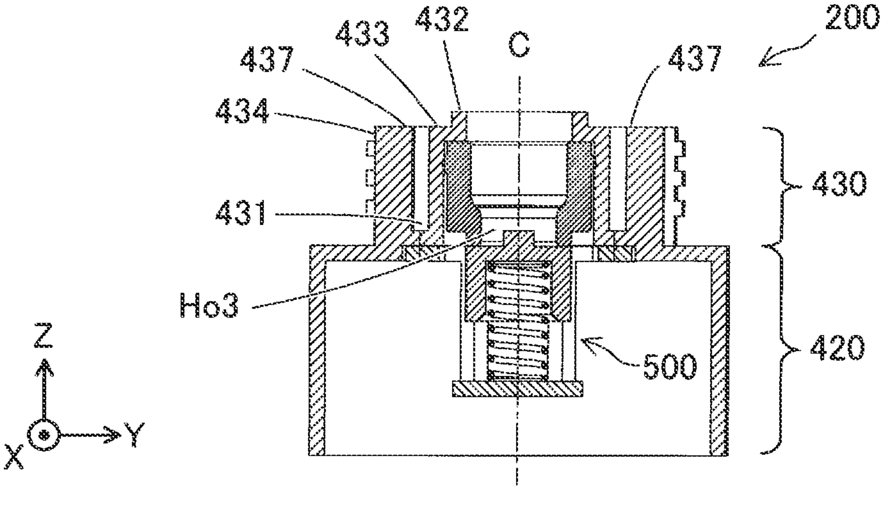
FIG. 8 is a sectional view taken along line VIII-VIII in FIG. 7.

FIG. 7 is a plan view in an upright state of the ink replenishment container 200 according to the first embodiment. FIG. 8 is a sectional view taken along line VIII-VIII in FIG. 7. FIGS. 7 and 8 illustrate the ink replenishment container 200 in a state where the cap 600 is detached.

As illustrated in FIG. 8, the ink outlet forming portion 400 includes the coupling portion 420 located on the rear end side and the tip portion 430 located on the tip side. The coupling portion 420 and the tip portion 430 are formed integrally with each other. The coupling portion 420 has a cylindrical shape. An inner diameter of the coupling portion 420 is slightly larger than an outer diameter on the tip side of the container main body portion 300. A female screw (not illustrated) is formed on an inner peripheral surface of the coupling portion 420, and a male screw (not illustrated) is formed on an outer peripheral surface on the tip side of the container main body portion 300. Therefore, the ink outlet forming portion 400 is screwed to the container main body portion 300.

As illustrated in FIG. 7, the tip portion 430 has a substantially recess shape opened on the tip side. The tip portion 430 includes a bottom portion 431, the ink outlet 432, an ink outlet outer peripheral portion 433, and a wall 434. A third through-hole Ho3 is formed in the Z-axis direction at a substantially center position of the bottom portion 431.

The ink outlet 432 is disposed at a position overlapping the third through-hole Ho3. The ink outlet 432 has a substantially cylindrical shape in which both ends are open in the axial direction. As illustrated in FIG. 8, the ink outlet 432 and the outlet valve unit 500 are disposed so that central axes overlap each other. Therefore, as described above, when the outlet valve unit 500 is in the valve opened state, the ink outlet 432 functions as a flow path of the ink when the ink tank 700 is replenished with the ink from the container main body portion 300.

As illustrated in FIG. 7, the ink outlet outer peripheral portion 433 is formed along the outer periphery of the ink outlet 432 to surround the ink outlet 432 in the circumferential direction. In addition, as illustrated in FIG. 8, the ink outlet 432 is formed to extend in the direction of the central axis C. A height of the ink outlet outer peripheral portion 433 in the direction of the central axis C is slightly lower than a height of the ink outlet 432.

The "central axis of the ink outlet 432" in the present disclosure means a normal line of an opening surface of the ink outlet 432, and is a normal line passing through the center of the opening of the ink outlet 432. In addition, as illustrated in FIG. 4, the central axis C of the outlet valve unit 500 coincides with the central axis C of the ink replenishment container 200. Therefore, the central axis of the ink outlet 432 coincides with the central axis C of the ink replenishment container 200.

As illustrated in FIG. 7, the wall 434 is formed to surround the periphery of the ink outlet outer peripheral portion 433, outside in the radial direction around the central axis C of the ink outlet 432. In addition, the wall 434 is formed to extend in the direction of the central axis C. The wall 434 is configured to correspond to and engage with the engaging portion 733 of the above-described ink tank 700. Specifically, the wall 434 includes a pair of third straight line portions 435 and a pair of third arch portions 436. All of the respective third straight line portions 435 are parallel to the Y-axis direction, and are located apart from each other in the right-left direction, that is, in the X-axis direction. Each of the third straight line portions 435 is coupled to the third arch portion 436 in both ends in the Y-axis direction. Each of the third arch portions 436 has a curved shape projecting in the +Y-direction or the −Y-direction in the XY-plane. The recess-and-projection portion 437 is disposed on the inner peripheral surface of each of the third arch portions 436. The recess-and-projection portion 437 has a recess-and-projection shape which can engage with the printer-side recess-and-projection portion 738 of the ink tank 700 in the XY-plane, and is formed to extend in the direction of the central axis C. As described above, the ink tank 700 can be replenished with the ink from only the ink replenishment container 200 having the recess-and-projection portion 437 which can engage with the printer-side recess-and-projection portion 738. Therefore, the recess-and-projection portion 437 of the ink replenishment container 200 also functions as an identifier that can identify the ink tank 700. As illustrated in FIG. 8, in the present embodiment, the height of the recess-and-projection portion 437 in the direction of the central axis C is the same as the height of the wall 434 in the direction of the central axis C. Description of the "same height" means not only exactly the same height but also a broad concept including a tolerance of approximately ±5%. In addition, a recessed portion 438 is formed on the outer peripheral surface of each of the third arch portions 436. The recessed portion 438 has a recess shape which can engage with the projection 741 of the ink tank 700. As illustrated in FIG. 7, the number of the recessed portions 438 is not limited to four, and any desired number such as one or more may be provided. In this case, the number of projections 741 of the ink inlet forming portion 730 is provided to correspond to the number of the recessed portions 438.

As described above, the wall 434 has a shape corresponding to the engaging portion 733 of the ink tank 700. Therefore, when the ink tank 700 is replenished with the ink by the ink replenishment container 200, the inner peripheral surface of the wall 434 engages with the outer peripheral surface of the engaging portion 733, and the outer peripheral surface of the wall 434 engages with the inner peripheral surface of the ink inlet surrounding portion 734.

Figure 9:
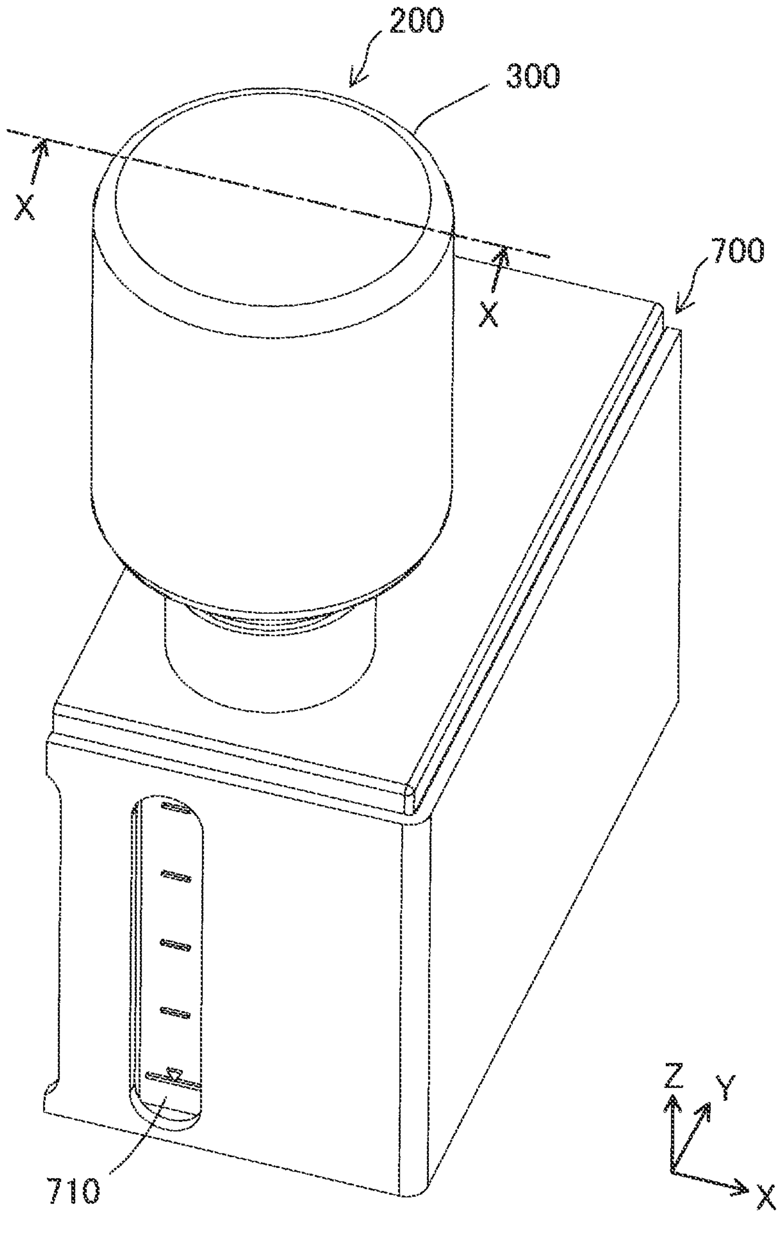
FIG. 9 is a perspective view illustrating a state where an ink tank is replenished with an ink.
Figure 10:
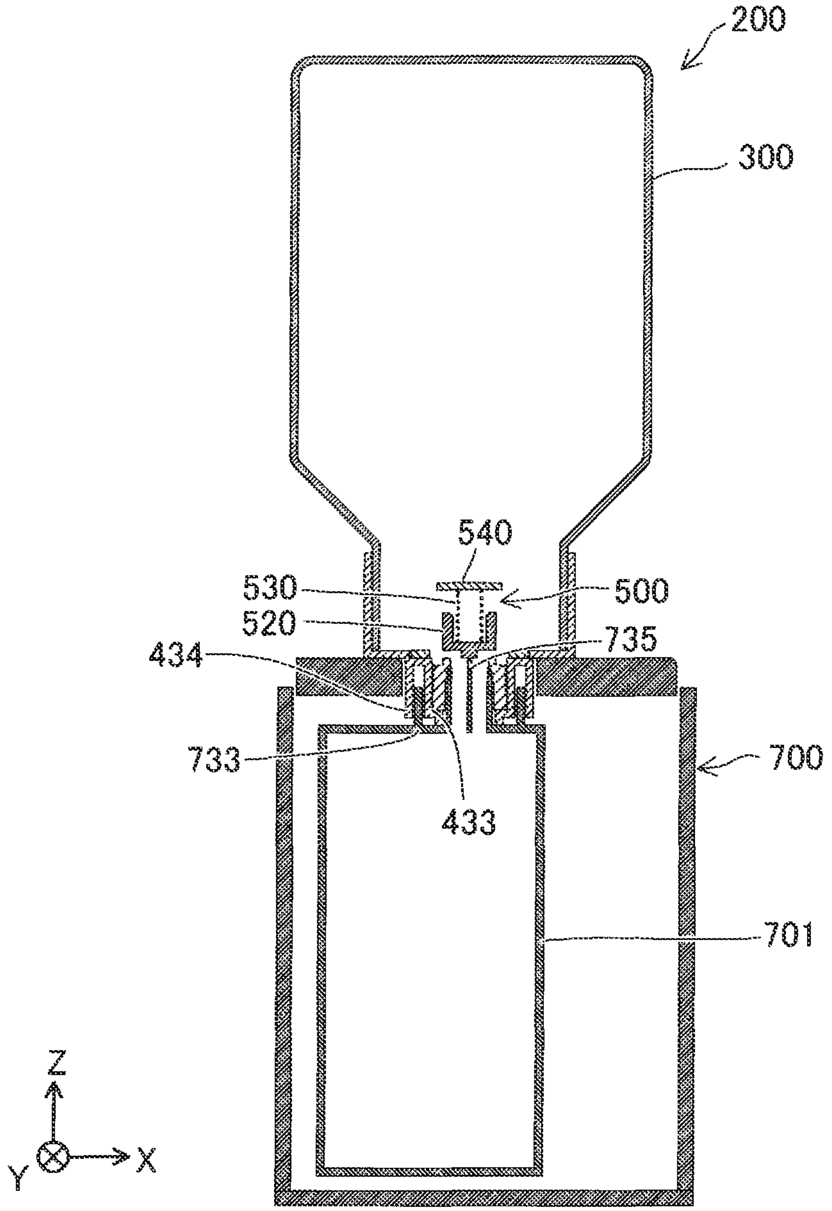
FIG. 10 is a sectional view taken along line X-X in FIG. 9.

FIG. 9 is a sectional view illustrating a replenishment state where the ink tank 700 is replenished with the ink from the ink replenishment container 200. Ink replenishment performed by using the ink replenishment container 200 in the above-described ink tank 700 will be described below. FIG. 10 is a sectional view taken along line XX in FIG. 9. In the present disclosure, the "replenishment state" refers to a state where the cap 600 of the ink replenishment container 200 is detached, the ink replenishment container 200 is inverted, and the ink replenishment container 200 is coupled to the ink tank 700. When a user confirms that the amount of the ink in the ink tank 700 is reduced through the visual recognition portion 710 on the front surface of the ink tank 700, the user starts the ink replenishment. As illustrated in FIGS. 2 and 3, the user opens the tank cap 720 upward to expose the ink inlet forming portion 730 to the outside. Next, as illustrated in FIGS. 9 and 10, the cap 600 of the ink replenishment container 200 is detached, and the ink replenishment container 200 is inverted. The ink outlet forming portion 400 and the ink inlet forming portion 730 are aligned and engaged with each other. At this time, the user confirms that the recess-and-projection portion 437 of the ink outlet forming portion 400 engages with the printer-side recess-and-projection portion 738 of the ink inlet forming portion 730, and the projection 741 of the ink inlet forming portion 730 engages with the recessed portion 438 of the ink outlet forming portion 400.

When not engaged, it can be understood that the ink to be used for the ink replenishment in the ink replenishment container 200 is different from the ink in the ink tank 700. That is, the user can recognize that the user tries to replenish the ink tank with the ink by using the erroneous ink replenishment container 200. When the correct ink replenishment container 200 is engaged, as illustrated in FIG. 10, the user pushes the ink replenishment container 200 further downward. In this manner, the valve body 520 of the outlet valve unit 500 comes into contact with the upper end of the partition wall 735 of the ink tank 700, and is pushed toward the rear end side. In this manner, the outlet valve unit 500 is brought into the valve opened state, and the ink flows from the ink replenishment container 200 into an ink chamber 701 inside the ink tank 700.

When the ink replenishment from the ink replenishment container 200 to the ink tank 700 is completed, the user pulls the ink replenishment container 200 upward. In this manner, the outlet valve unit 500 is brought into the valve closed state, and an outflow of the ink from the ink replenishment container 200 to the ink tank 700 is stopped.

According to the ink replenishment container 200 in the first embodiment described above, the recess-and-projection portion 437 is formed on the inner peripheral surface of the wall 434 of the ink outlet forming portion 400. According to this configuration, the recess-and-projection portion 437 is protected by the wall 434. Therefore, it is possible to prevent the recess-and-projection portion 437 from being deformed or damaged due to an impact from the outside.

In addition, the recess-and-projection portion 437 is disposed on the inner peripheral surface of the wall 434. Therefore, it is possible to prevent the ink replenishment container 200 from increasing in size, compared to a configuration in which the recess-and-projection portion is disposed outside the wall 434.

In addition, the recess-and-projection portion 437 is formed on the inner peripheral surface of the wall 434. Therefore, even when an ink droplet flows out from the ink outlet 432, the ink droplet is held in the recess-and-projection portion 437. Therefore, it is possible to prevent a user's hand or the printer 100 from being contaminated by the ink droplet.

In addition, the wall 434 has the pair of third straight line portions 435 and the pair of third arch portions 436. Therefore, positions of each of the third straight line portions 435 of the ink replenishment container 200 and each of the first straight line portions 736 of the ink tank 700 are aligned with each other. Alternatively, positions of each of the third arch portions 436 of the ink replenishment container 200 and each of the first arch portions 737 of the ink tank 700 are aligned with each other. In this manner, when the user replenishes the ink tank 700 with the ink, the ink replenishment container 200 can be easily coupled to the ink tank 700.

In addition, the recess-and-projection portion 437 is formed at a line-symmetrical position around the ink outlet 432. Therefore, when the user replenishes the ink tank 700 with the ink, the user can easily perform the alignment. Therefore, it is possible to shorten a time required for the user to confirm a coupling direction between the ink replenishment container 200 and the ink tank 700.

In addition, the recessed portion 438 is formed on the outer peripheral surface of each of the third arch portions 436. Therefore, the recessed portion 438 can also function as an identifier. Therefore, a shape pattern of the ink outlet forming portion 400 can be increased by changing the position of the number of the recessed portions 438. In addition, compared to a configuration in which the recessed portion 438 is not formed, the number of places where the ink outlet forming portion 400 and the ink inlet forming portion 730 engage with each other increases. Therefore, a posture of the ink replenishment container 200 is more easily stabilized in an ink replenishment state.

B. Another Embodiment

B1. Another Embodiment 1

Figure 11:
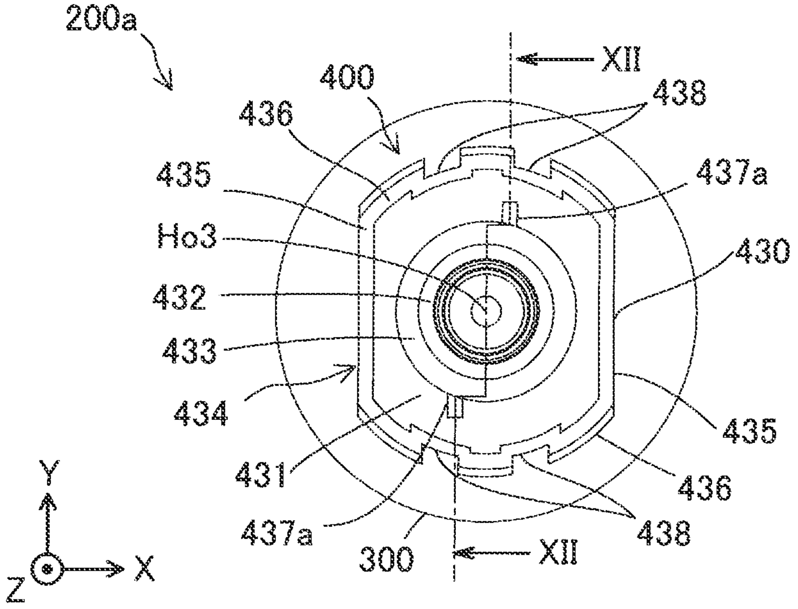
FIG. 11 is a plan view of the ink replenishment container in which a recess-and-projection portion is disposed on an outer peripheral surface of an ink outlet outer peripheral portion.
Figure 12:
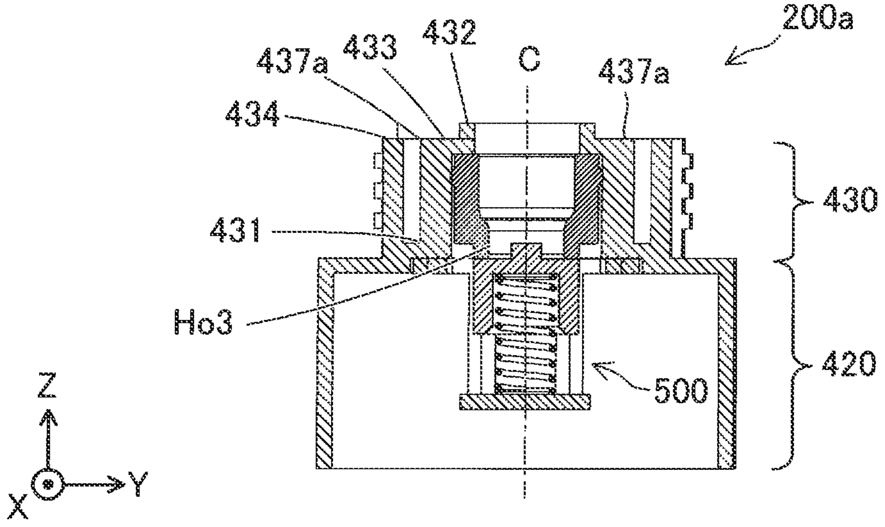
FIG. 12 is a sectional view taken along line XII-XII in FIG. 11.

In the ink replenishment container 200 of the first embodiment described above, the recess-and-projection portion 437 is disposed on the inner peripheral surface of the wall 434, but the present disclosure is not limited thereto. FIG. 11 is a plan view of an ink replenishment container 200*a* in which a recess-and-projection portion 437*a* is disposed on the outer peripheral surface of the ink outlet outer peripheral portion 433. FIG. 12 is a sectional view taken along line XII-XII in FIG. 11. As illustrated in FIGS. 11 and 12, a configuration may be adopted in which the recess-and-projection portion 437*a* is provided on the outer peripheral surface of the ink outlet outer peripheral portion 433. The ink outlet outer peripheral portion 433 is formed along the periphery of the ink outlet 432. Therefore, the outer peripheral surface of the ink outlet outer peripheral portion 433 can be the outer peripheral surface of the ink outlet 432. Corresponding to the ink replenishment container 200*a* having this configuration, in the ink inlet forming portion 730 of the ink tank 700, the printer-side recess-and-projection portion 738 is formed on the outer peripheral surface of the ink inlet 732. Even in this configuration, the same advantageous effect as that of the ink replenishment container 200 of the first embodiment can be obtained. In addition, the recess-and-projection portion 437*a* is formed on the further inner side in the radial direction, compared to the recess-and-projection portion 437 formed in the ink replenishment container 200 of the first embodiment. Therefore, it is possible to further prevent the recess-and-projection portion 437*a* from being deformed or damaged due to the impact.

B2. Another Embodiment 2

Figure 13:
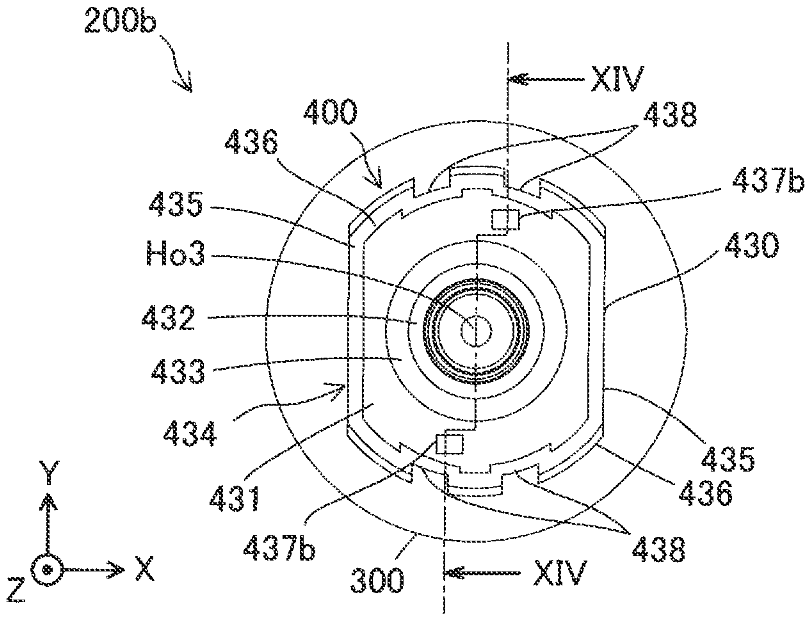
FIG. 13 is a plan view of the ink replenishment container in which the recess-and-projection portion is disposed in a space between a wall and the outer peripheral surface of the ink outlet outer peripheral portion.
Figure 14:
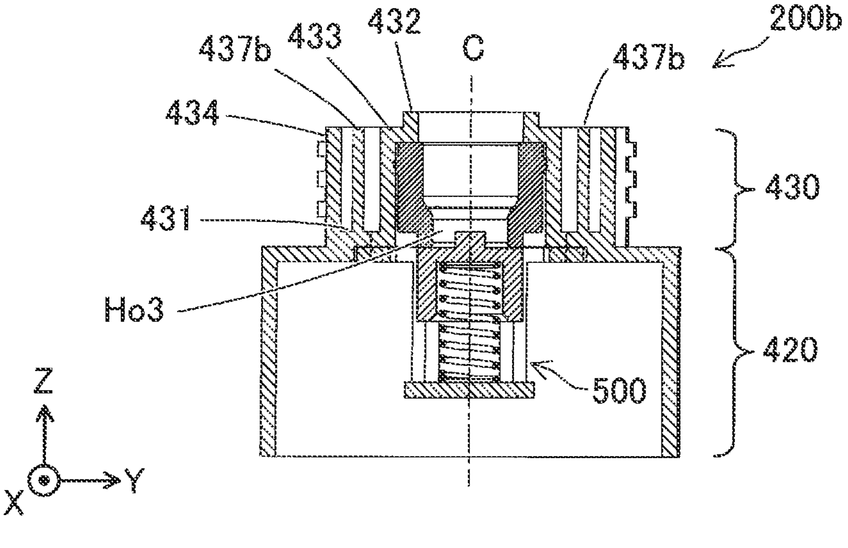
FIG. 14 is a sectional view taken along line XIV-XIV in FIG. 13.

In the ink replenishment container 200 of the first embodiment described above, the recess-and-projection portion 437 is disposed on the inner peripheral surface of the wall 434, but the present disclosure is not limited thereto. FIG. 13 is a plan view of an ink replenishment container 200*b* in which a recess-and-projection portion 437*b* is disposed in a space between the wall 434 and the outer peripheral surface of the ink outlet outer peripheral portion 433. FIG. 14 is a sectional view taken along line XIV-XIV in FIG. 13. As illustrated in FIGS. 13 and 14, a configuration may be adopted in which the recess-and-projection portion 437*b* is disposed in the space between the wall 434 and the outer peripheral surface of the ink outlet outer peripheral portion 433. The recess-and-projection portion 437*b* has a substantially rectangular parallelepiped shape extending from the bottom portion 431 along the central axis C. Corresponding to the ink replenishment container 200*b* having this configuration, in the ink inlet forming portion 730 of the ink tank 700, the printer-side recess-and-projection portion 738 is formed to extend from the bottom surface 731 in the Z-axis direction in a space surrounded by the ink inlet 732, the first straight line portion 736, and the first arch portion 737. Even in this configuration, the same advantageous effect as that of the ink replenishment container 200 of the first embodiment can be obtained.

B3. Another Embodiment 3

In the ink replenishment container 200 of the first embodiment described above, the recess-and-projection portion 437 is disposed on the inner peripheral surface of the wall 434, but the present disclosure is not limited thereto. A configuration may be adopted in which the recess-and-projection portions 437 are disposed at two locations of or all of the inner peripheral surface of the wall 434, the outer peripheral surface of the ink outlet outer peripheral portion 433, and the space between the inner peripheral surface of the wall 434 and the outer peripheral surface of the ink outlet outer peripheral portion 433. Even in this configuration, the same advantageous effect as that of the ink replenishment container 200 of the first embodiment can be obtained. Furthermore, compared to a configuration in which the recess-and-projection portion 437 is disposed at only one location of the inner peripheral surface of the wall 434, the outer peripheral surface of the ink outlet outer peripheral portion 433, and the space between the inner peripheral surface of the wall 434 and the outer peripheral surface of the ink outlet outer peripheral portion 433, it is possible to increase the number of patterns at positions where the recess-and-projection portions 437 are provided. Therefore, a shape pattern of the recess-and-projection portion 437 that functions as the identifier can be increased without enlarging a size of the ink outlet forming portion 400. In addition, the number of the recess-and-projection portions 437 which engage with the printer-side recess-and-projection portions 738 increases. Therefore, a posture of the ink replenishment container 200 is likely to be stabilized in the ink replenishment state. In this configuration, the printer-side recess-and-projection portion 738 is formed at a corresponding position of the ink outlet forming portion 400 of the ink tank 700.

B4. Another Embodiment 4

Figure 15:
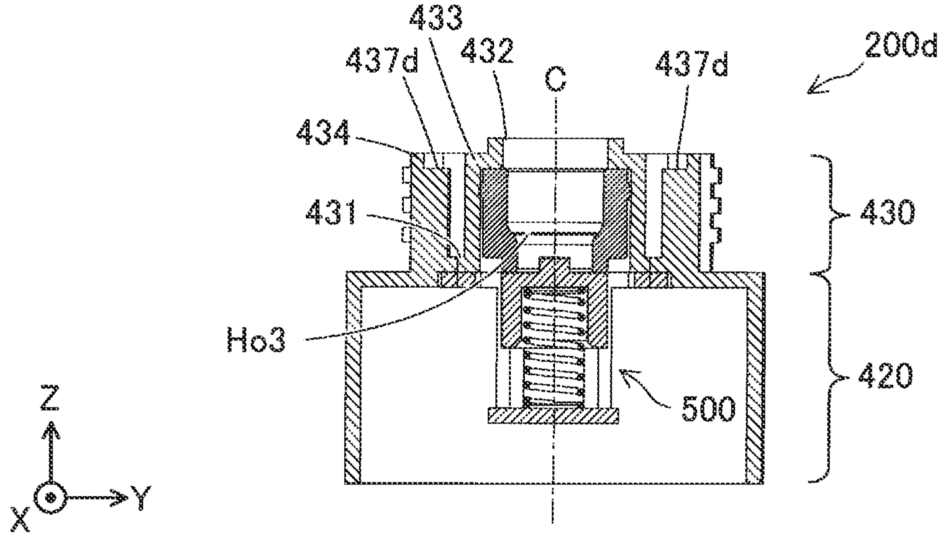
FIG. 15 is a sectional view of the ink replenishment container having a configuration in which a height of the recess-and-projection portion is lower than a height of the wall.

In the ink replenishment container 200 of the first embodiment, the height of the recess-and-projection portion 437 in the direction of the central axis C is the same as the height of the wall 434 in the direction of the central axis C, but the present disclosure is not limited thereto. FIG. 15 is a sectional view of an ink replenishment container 200*d* configured so that the height of the recess-and-projection portion 437*d* is lower than the height of the wall 434. As illustrated in FIG. 15, a configuration may be adopted in which the height of the recess-and-projection portion 437*d* is lower than the height of the wall 434. Even in this configuration, the same advantageous effect as that of the ink replenishment container 200 of the first embodiment can be obtained. In addition, the height of the recess-and-projection portion 437*d* is lower than that of the wall 434. Therefore, an impact not only in the radial direction but also in the direction of the central axis C is less likely to be applied to the recess-and-projection portion 437*d*. Therefore, it is possible to further prevent the recess-and-projection portion 437*d* from being deformed or damaged due to an impact from the outside.

B5. Another Embodiment 5

Figure 16:
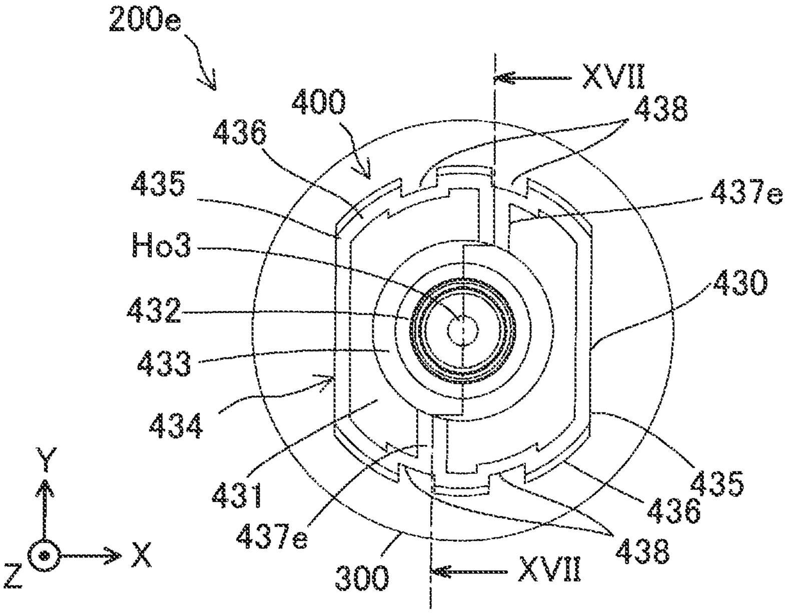
FIG. 16 is a plan view of the ink replenishment container in which the recess-and-projection portion is disposed so that the wall and the ink outlet outer peripheral portion are joined to the space between the wall and the outer peripheral surface of the ink outlet outer peripheral portion.
Figure 17:
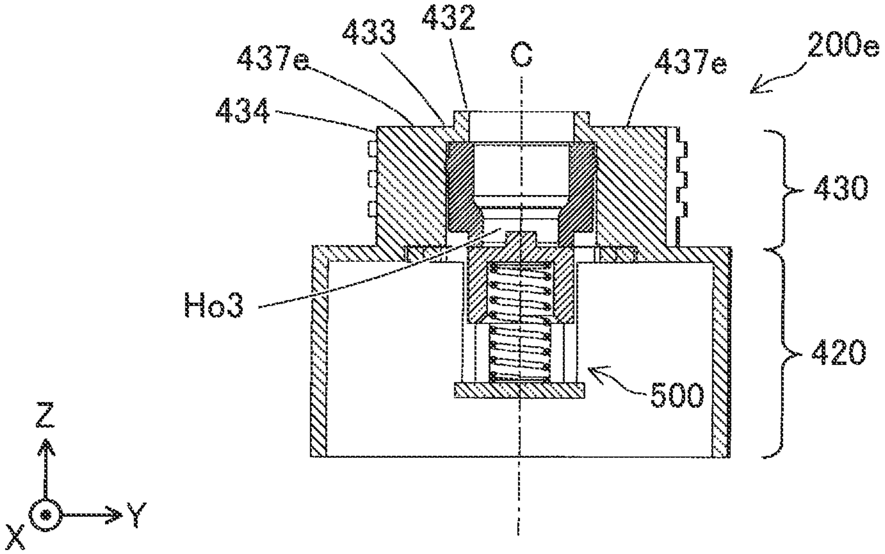
FIG. 17 is a sectional view taken along line XVII-XVII in FIG. 16.

In the ink replenishment container 200 of the first embodiment described above, the recess-and-projection portion 437 is disposed on the inner peripheral surface of the wall 434, but the present disclosure is not limited thereto. FIG. 16 is a plan view of an ink replenishment container 200*e* in which a recess-and-projection portion 437*e* is disposed so that the wall 434 and the ink outlet outer peripheral portion 433 are joined to a space between the wall 434 and the outer peripheral surface of the ink outlet outer peripheral portion 433. FIG. 17 is a sectional view taken along line XVII-XVII in FIG. 16. As illustrated in FIGS. 16 and 17, a configuration may be adopted in which the recess-and-projection portion 437*e* is continuously disposed in the space between the wall 434 and the outer peripheral surface of the ink outlet outer peripheral portion 433. Even in this configuration, the same advantageous effect as that of the ink replenishment container 200 of the first embodiment can be obtained. In addition, in this configuration, the space between the wall 434 and the ink outlet outer peripheral portion 433 is divided into two by the recess-and-projection portion 437*e*. Therefore, when a plurality of ink droplets adhere to the space, compared to a configuration in which the space is not divided into two, it is possible to prevent the ink droplets from aggregating and forming a large ink droplet. Therefore, it is possible to prevent the user's hand or the printer 100 from being contaminated by the large ink droplets. The space divided by the recess-and-projection portion 437*e* may be divided into spaces other than two, and may be divided into any desired number of spaces such as three or more.

B6. Another Embodiment 6

Figure 18:
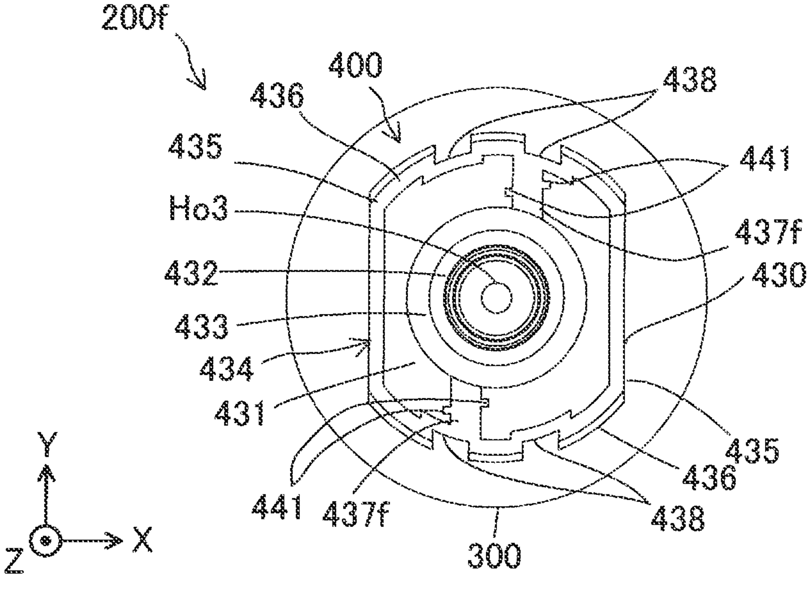
FIG. 18 is a plan view of the ink replenishment container including the recess-and-projection portion having a protruding portion.

A protruding portion 441 may be formed in the recess-and-projection portion 437*e* of Another Embodiment 5 described above. FIG. 18 is a plan view of an ink replenishment container 200*f* including a recess-and-projection portion 437*f* in which the protruding portion 441 is formed. As illustrated in FIG. 18, the protruding portion 441 that protrudes in the +X-direction and the −X-direction of the recess-and-projection portion 437*f* is provided. Even in this a configuration, the same advantageous effect as that of the ink replenishment container 200*e* of Another Embodiment 5 can be obtained. In addition, a shape pattern of the recess-and-projection portion 437*f* can be increased by changing the position or the number of the protruding portions 441. Therefore, a pattern of the recess-and-projection portion 437*f* that functions as the identifier can be further increased without enlarging a size of the ink outlet forming portion 400.

B7. Another Embodiment 7

Figure 19:
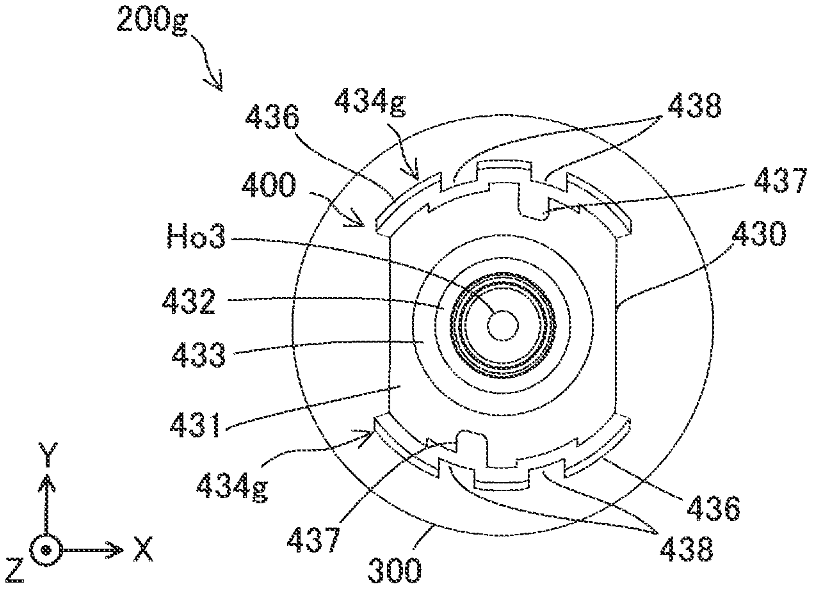
FIG. 19 is a plan view of the ink replenishment container formed so that the wall surrounds a portion in a circumferential direction around an axis of an ink outlet.

In the ink replenishment container 200 of the first embodiment described above, the wall 434 is formed to surround the entire circumferential direction around the central axis C of the ink outlet 432, but the present disclosure is not limited thereto. FIG. 19 is a plan view of an ink replenishment container 200*g* formed so that a wall 434*g* surrounds a portion in the circumferential direction around the central axis C of the ink outlet 432. As illustrated in FIG. 19, the wall 434*g* may be provided only in the +Y-direction and the −Y-direction of the ink outlet 432. That is, the pair of second straight line portions 739 may be removed from the ink replenishment container 200 in the first embodiment, and the wall 434*g* may be formed by only the pair of second arch portions 740. Even in this configuration, the same advantageous effect as that of the ink replenishment container 200 according to the first embodiment can be obtained. In addition, a size of the ink outlet forming portion 400 can be reduced as much as a member corresponding to the second straight line portion 739 does not exist.

B8. Another Embodiment 8

Figure 20:
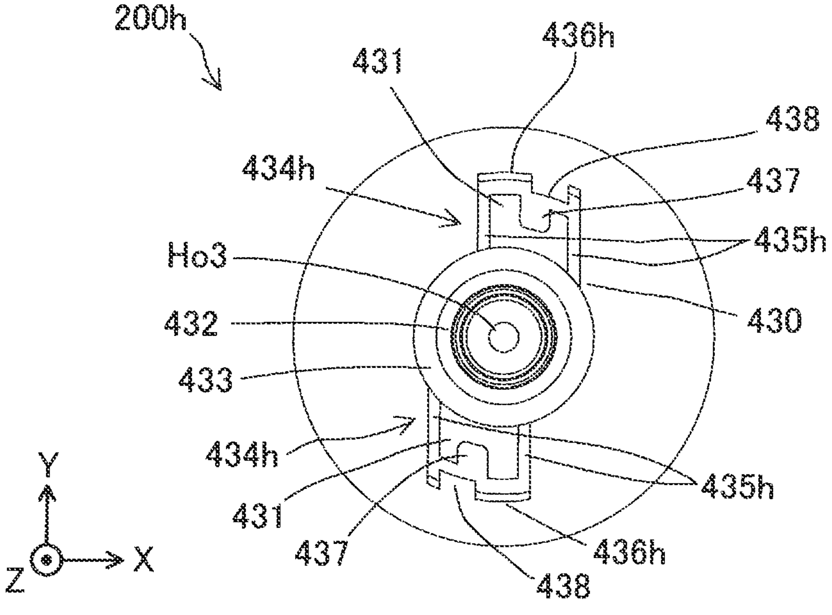
FIG. 20 is a plan view of an ink replenishment container according to another Embodiment 8.

The wall 434*g* of Another Embodiment 7 described above may be formed to surround at least a portion in the recess-and-projection portion 437 excluding a portion facing the ink outlet 432. FIG. 20 is a plan view of an ink replenishment container 200*h* according to Another Embodiment 8. As illustrated in FIG. 20, a wall 434*h* of the ink replenishment container 200*h* is disposed in a portion around the ink outlet outer peripheral portion 433, extends in the direction of the central axis C, and is disposed to surround the recess-and-projection portion 437. Specifically, the wall 434*h* includes a pair of fourth straight line portions 435*h* and an arc portion 436*h*. Each of the fourth straight line portions 435*h* is formed to extend in the Y-axis direction. Each of the fourth straight line portions 435*h* is coupled to the ink outlet outer peripheral portion 433 in an end portion on the ink outlet 432 side, and is coupled to the arc portion 436*h* in the other end portion. The arc portion 436*h* is disposed in an arc shape, apart from the ink outlet outer peripheral portion 433. Both ends of the arc portion 436*h* are coupled to each of the fourth straight line portions 435*h*. The recess-and-projection portion 437 is formed on the inner peripheral surface of the arc portion 436*h*, and the recessed portion 438 is formed on the outer peripheral surface. In addition, in the present embodiment, a pair of regions surrounded by the wall 434*h* are formed on the side in the +Y-direction and on the side in the −Y-direction of the ink outlet 432, and exist at positions shifted from each other in the X-axis direction. According to this configuration, the recess-and-projection portion 437 is surrounded by the wall 434*h* except for a portion facing the ink outlet outer peripheral portion 433 and a portion on the tip portion side. Even in this configuration, the same advantageous effect as that of the ink replenishment container 200*g* according to Another Embodiment 7 can be obtained. Furthermore, according to the ink replenishment container 200*h* of the present embodiment, the recess-and-projection portion 437 is protected by the pair of fourth straight line portions 435*h* and the arc portion 436*h*. Therefore, it is possible to further prevent the recess-and-projection portion 437 from being deformed or damaged.

B9. Another Embodiment 9

In Another Embodiment 8 described above, the wall 434*h* is formed to surround a portion in the recess-and-projection portion 437 excluding at least a portion facing the ink outlet 432 and an end surface on the tip side. In addition to this configuration, the wall 434*h* may be further formed between the recess-and-projection portion 437 and the ink outlet 432. That is, the recess-and-projection portion 437 is surrounded by the wall 434*h* except for the end surface on the tip side. According to this configuration, all sides of the recess-and-projection portion 437 are surrounded. Therefore, it is possible to further prevent the recess-and-projection portion 437 from being deformed or damaged due to an impact from the outside.

B10. Another Embodiment 10

Figure 21:
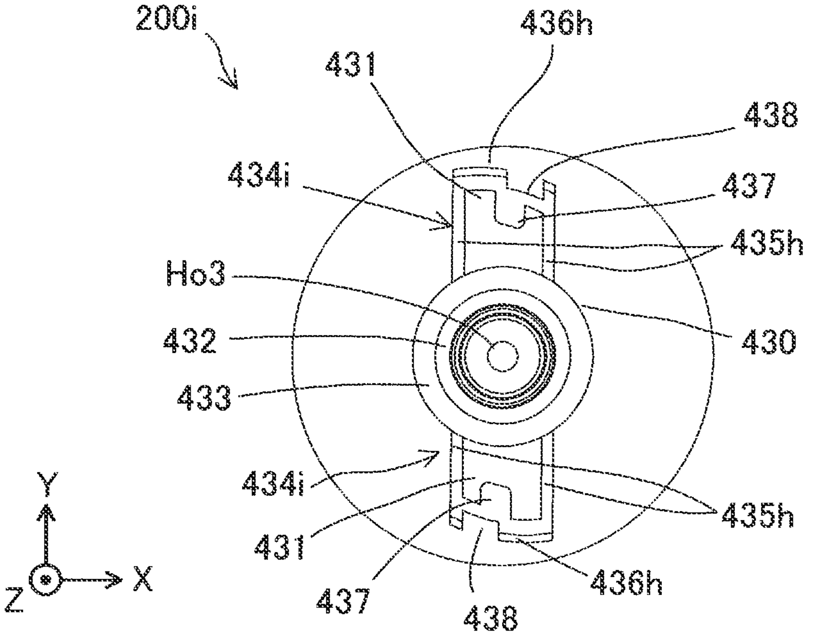
FIG. 21 is a plan view of an ink replenishment container according to still another Embodiment 10.

The region surrounded by the wall 434*h* of Another Embodiment 8 described above may exist at positions aligned with each other in the X-axis direction. FIG. 21 is a plan view of an ink replenishment container 200*i* according to Another Embodiment 10. As illustrated in FIG. 21, a pair of regions surrounded by a wall 434*i* are formed on the side in the +Y-direction and on the side in the −Y-direction of the ink outlet 432, and exist at positions aligned with each other in the X-axis direction. Even in this configuration, the same advantageous effect as that of the ink replenishment container 200*h* according to Another Embodiment 8 can be obtained.

B11. Another Embodiment 11

In Another Embodiment 8 to Another Embodiment 10 described above, the pair of regions surrounded by the wall 434*h* exists, but instead of the pair, any desired number of regions may exist.

B12. Another Embodiment 12

Figure 22:
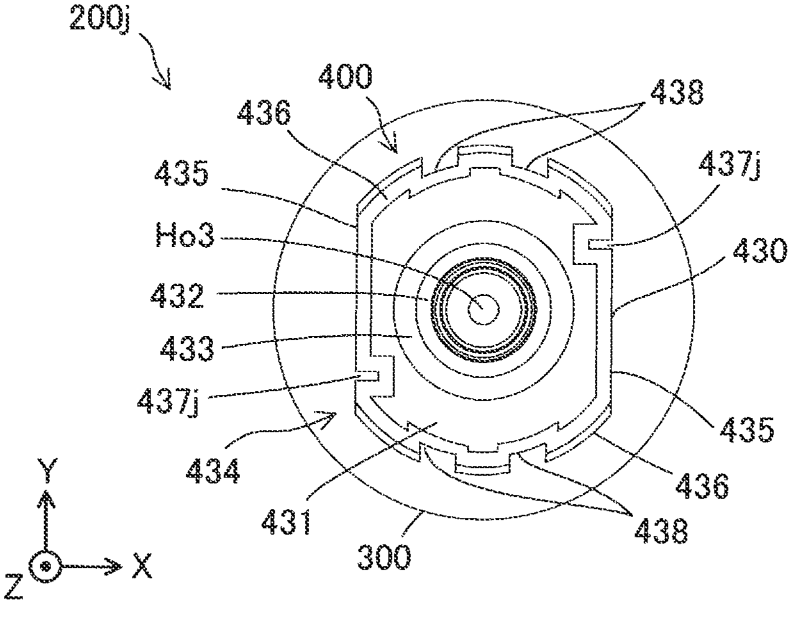
FIG. 22 is a plan view of the ink replenishment container in which the recess-and-projection portion is disposed in a third straight line portion.
Figure 23:
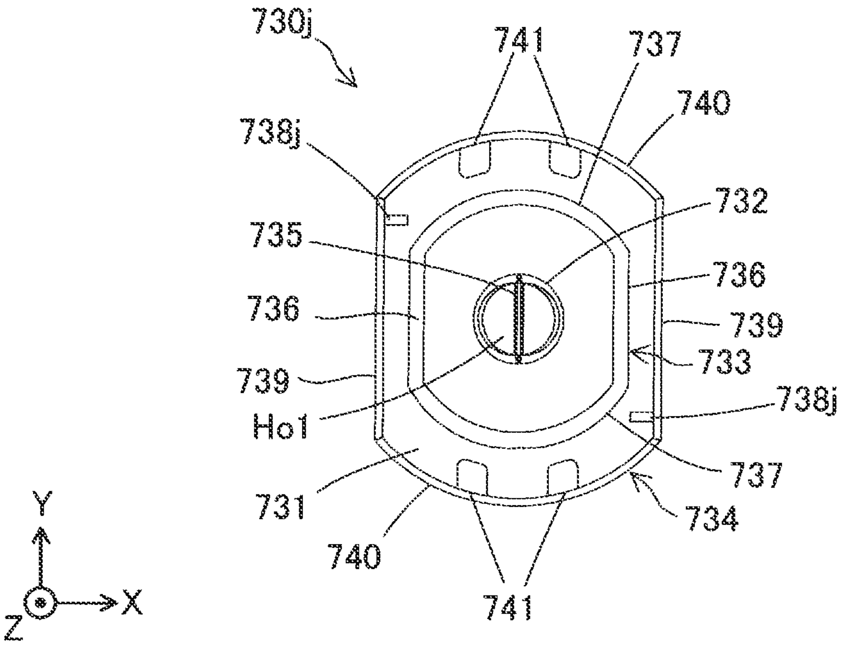
FIG. 23 is a plan view of an ink inlet forming portion in which a printer-side recess-and-projection portion is provided in a second straight line portion.

In the ink replenishment container 200 of the first embodiment, the recess-and-projection portion 437 is disposed on the inner peripheral surface of the third arch portion 436, but the present disclosure is not limited thereto. The recess-and-projection portion 437 may be provided in the third straight line portion 435 instead of the third arch portion 436. In addition, in the ink replenishment container 200 of the first embodiment described above, the recess-and-projection portion 437 of the ink replenishment container 200 that functions as a projection portion and the printer-side recess-and-projection portion 738 of the ink tank 700 that functions as a recess portion are configured to engage with each other. However, the present disclosure is not limited thereto. The recess-and-projection portion 437 of the ink replenishment container 200 may function as the recess portion, and the printer-side recess-and-projection portion 738 of the ink tank 700 may function as the projection portion. FIG. 22 is a plan view of an ink replenishment container 200*j* in which a recess-and-projection portion 437*j* is disposed in the third straight line portion 435. FIG. 23 is a plan view of an ink inlet forming portion 730*j* in which a printer-side recess-and-projection portion 738*j* is provided in the second straight line portion 739. As illustrated in FIG. 22, the recess-and-projection portion 437*j* of the ink replenishment container 200*j* is configured as a portion in the third straight line portion 435 in which the inner peripheral surface protrudes inward and the outer peripheral surface is recessed inward. A pair of the recess-and-projection portions 437*j* are disposed at point-symmetrical positions around the ink outlet 432. As illustrated in FIG. 23, corresponding to the ink replenishment container 200*j* having this configuration, in the ink inlet forming portion 730*j* of the ink tank 700, the printer-side recess-and-projection portion 738*j* is disposed to protrude inward from the inner peripheral surface of the second straight line portion 739. A pair of the printer-side recess-and-projection portions 738*j* are formed at point-symmetrical positions around the ink inlet 732. During replenishment of the ink, when the ink replenishment container 200*j* illustrated in FIG. 22 is mounted on the ink inlet forming portion 730*j* illustrated in FIG. 23, the pair of recess-and-projection portions 437*j* and the pair of printer-side recess-and-projection portions 738*j* engage with each other. Even in this configuration, the same advantageous effect as that of the ink replenishment container 200 of the first embodiment can be obtained.

C. Other Forms

The present disclosure is not limited to the above-described embodiments, and can be realized in various configurations within the scope not departing from the concept of the present disclosure. For example, technical features in the embodiments corresponding to technical features in each form described in a column of the outline of the disclosure can be appropriately replaced or combined to partially or entirely solve the above-described problems, or to partially or entirely achieve the above-described advantageous effects. In addition, when the technical features are not described herein as essential elements, the technical features can be appropriately deleted.

1. According to a first aspect of the present disclosure, there is provided an ink replenishment container for replenishing an ink by engaging with an engaging portion included in a printer. The ink replenishment container includes a cylindrical ink outlet, a wall disposed around the ink outlet outside the ink outlet in a radial direction around a central axis of the ink outlet and extending in an axial direction along the central axis, and an recess-and-projection portion disposed in at least one location of an outer peripheral surface of the ink outlet, an inner peripheral surface of the wall, and a space between the outer peripheral surface of the ink outlet and the inner peripheral surface of the wall, the recess-and-projection portion engaging with the engaging portion of the printer, in a state where the printer is replenished with the ink.

According to the ink replenishment container in this form, the recess-and-projection portion is formed in at least one location of the outer peripheral surface of the ink outlet, the inner peripheral surface of the wall, and the space between the outer peripheral surface of the ink outlet and the inner peripheral surface of the wall. Therefore, the recess-and-projection portion is shielded by the wall in the radial direction. Therefore, compared to a configuration in which the recess-and-projection portion is exposed to the outside, it is possible to prevent the recess-and-projection portion from being deformed or damaged due to an impact.

In addition, the recess-and-projection portion is disposed in at least one location of the outer peripheral surface of the ink outlet, the inner peripheral surface of the wall, and the space between the outer peripheral surface of the ink outlet and the inner peripheral surface of the wall. Therefore, a disposition pattern of the recess-and-projection portion can be easily increased by increasing the number of disposition locations of the recess-and-projection portions.

In addition, the disposition location of the recess-and-projection portion is the space from the outer peripheral surface of the ink outlet to the inner peripheral surface of the wall. Therefore, compared to a configuration in which the recess-and-projection portion is disposed outside the wall, it is possible to prevent a size increase in the ink replenishment container.

In addition, when the ink droplets flow out from the ink replenishment container, the ink droplets are held in the recess-and-projection portion. Therefore, it is possible to prevent the user's hand or the printer from being contaminated by the ink droplets.

2. In the first aspect, the recess-and-projection portion may be disposed on the outer peripheral surface of the ink outlet.

According to the ink replenishment container in this form, the recess-and-projection portion is disposed on the outer peripheral surface of the ink outlet. Therefore, the recess-and-projection portion is formed on the further inner side in the radial direction of the ink replenishment container. Therefore, it is possible to further prevent the recess-and-projection portion from being deformed or damaged due to an impact from the outside.

3. In the first aspect, the recess-and-projection portions may be disposed in or on all of the outer peripheral surface of the ink outlet, the inner peripheral surface of the wall, and the space between the outer peripheral surface of the ink outlet and the inner peripheral surface of the wall.

According to the ink replenishment container in this form, the recess-and-projection portions are disposed in or on all of the outer peripheral surface of the ink outlet, the inner peripheral surface of the wall, and the space between the outer peripheral surface of the ink outlet and the inner peripheral surface of the wall. Therefore, compared to a configuration in which the recess-and-projection portion is disposed in any one location of the outer peripheral surface of the ink outlet, the inner peripheral surface of the wall, and the space between the outer peripheral surface of the ink outlet and the inner peripheral surface of the wall, a disposition pattern of the recess-and-projection portions can be further increases without enlarging a size of the ink replenishment container.

In addition, the number of the recess-and-projection portions which engage with the printer-side engaging portion increases. Therefore, a posture of the ink replenishment container is easily stabilized, when the ink replenishment container is inverted and replenished with the ink.

4. In the first aspect, the recess-and-projection portion may have the same height as the wall or a lower height than the wall in the axial direction.

According to the ink replenishment container in this form, the height of the recess-and-projection portion in the axial direction is equal to or lower than the height of the wall in the axial direction. Therefore, the recess-and-projection portion is further shielded by the wall. Therefore, it is possible to further prevent the recess-and-projection portion from being deformed or damaged due to an external impact not only in the radial direction but also in the axial direction.

5. In the first aspect, the recess-and-projection portion may have an recess-and-projection shape when viewed from a tip side of the ink outlet in the axial direction.

According to the ink replenishment container in this form, the shape pattern serving as the identifier can be increased by the shape of the recess-and-projection portion.

6. According to a second aspect of the present disclosure, there is provided an ink replenishment container for replenishing an ink by engaging with an engaging portion included in a printer. The ink replenishment container includes a cylindrical ink outlet, a wall disposed in a portion around the ink outlet and extending in an axial direction along a central axis of the ink outlet, outside the ink outlet in a radial direction around the central axis, and an recess-and-projection portion disposed in at least one location of an outer peripheral surface of the ink outlet, an inner peripheral surface of the wall, and a space between the outer peripheral surface of the ink outlet and the inner peripheral surface of the wall, the recess-and-projection portion engaging with the engaging portion of the printer, in a state where the printer is replenished with the ink. The wall is disposed to surround at least a portion of the recess-and-projection portion excluding a portion facing the ink outlet.

According to the ink replenishment container in this form, the wall is disposed in a portion around the ink outlet. Therefore, compared to a configuration in which the wall surrounds the entire periphery of the ink outlet, the ink replenishment container can be configured to be more compact.

In addition, the recess-and-projection portion is shielded by the wall. Therefore, it is possible to prevent the recess-and-projection portion from being deformed or damaged due to an impact from the outside.

7. According to a third aspect of the present disclosure, there is provided a printer including the engaging portion including a printer-side recess-and-projection portion that engages with the recess-and-projection portion of the ink replenishment container in the above-described forms.

According to the printer in this form, the recess-and-projection portion of the ink replenishment container and the printer-side recess-and-projection portion appropriately engage with each other. Therefore, it is possible to prevent erroneous filling of the ink.

What is claimed is:

1. An ink replenishment container for replenishing an ink by engaging with an engaging portion included in a printer, comprising:

a cylindrical ink outlet;

a wall disposed around the ink outlet outside the ink outlet in a radial direction around a central axis of the ink outlet and extending in an axial direction along the central axis; and a recess-and-projection portion disposed inside an inner peripheral surface of the wall in a radial direction and in at least one location of an outer peripheral surface of the ink outlet between the outer peripheral surface of the ink outlet and the inner peripheral surface of the wall, the inner peripheral surface of the wall, and a space between the outer peripheral surface of the ink outlet and the inner peripheral surface of the wall, the recess-and-projection portion engaging with the engaging portion of the printer, in a state where the printer is replenished with the ink, wherein the wall completely surrounds the ink outlet when viewed in the axial direction.

2. The ink replenishment container according to claim 1, wherein the recess-and-projection portion is disposed on the outer peripheral surface of the ink outlet.

3. The ink replenishment container according to claim 1, wherein the recess-and-projection portion is disposed in or on all of the outer peripheral surface of the ink outlet, the inner peripheral surface of the wall, and the space between the outer peripheral surface of the ink outlet and the inner peripheral surface of the wall.

4. The ink replenishment container according to claim 1, wherein the recess-and-projection portion has the same height as the wall or a lower height than the wall in the axial direction.

5. The ink replenishment container according to claim 1, wherein the recess-and-projection portion has a recess-and-projection shape when viewed from a tip side of the ink outlet in the axial direction.

6. A printer comprising:

a printer-side recess-and-projection portion that is provided in the engaging portion and engages with the recess-and-projection portion of the ink replenishment container according to claim 1.

7. An ink replenishment container for replenishing an ink by engaging with an engaging portion included in a printer, comprising:

a cylindrical ink outlet;

a wall disposed in a portion around the ink outlet outside the ink outlet in a radial direction around a central axis of the ink outlet and extending in an axial direction along the central axis; and a recess-and-projection portion disposed inside an inner peripheral surface of the wall in a radial direction and in at least one location of an outer peripheral surface of the ink outlet between the outer peripheral surface of the ink outlet and the inner peripheral surface of the wall, the inner peripheral surface of the wall, and a space between the outer peripheral surface of the ink outlet and the inner peripheral surface of the wall, the recess-and-projection portion engaging with the engaging portion of the printer, in a state where the printer is replenished with the ink, wherein the wall is disposed, when viewed in the axial direction, to surround the recess-and-projection portion in all directions except in a direction in which the recess-and-projection portion faces the ink outlet.

* * * * *